Nov. 5, 1963  H. J. WILSON  3,109,666
CONVERTIBLE AND FOLDABLE BABY APPARATUS
Filed Nov. 30, 1960  5 Sheets-Sheet 1

INVENTOR.
HARRY JAMES WILSON
BY *A. M. Shapiro*
Attorney

Nov. 5, 1963 H. J. WILSON 3,109,666
CONVERTIBLE AND FOLDABLE BABY APPARATUS
Filed Nov. 30, 1960 5 Sheets-Sheet 3

INVENTOR.
HARRY JAMES WILSON
BY
*A. M. Shapiro*
Attorney

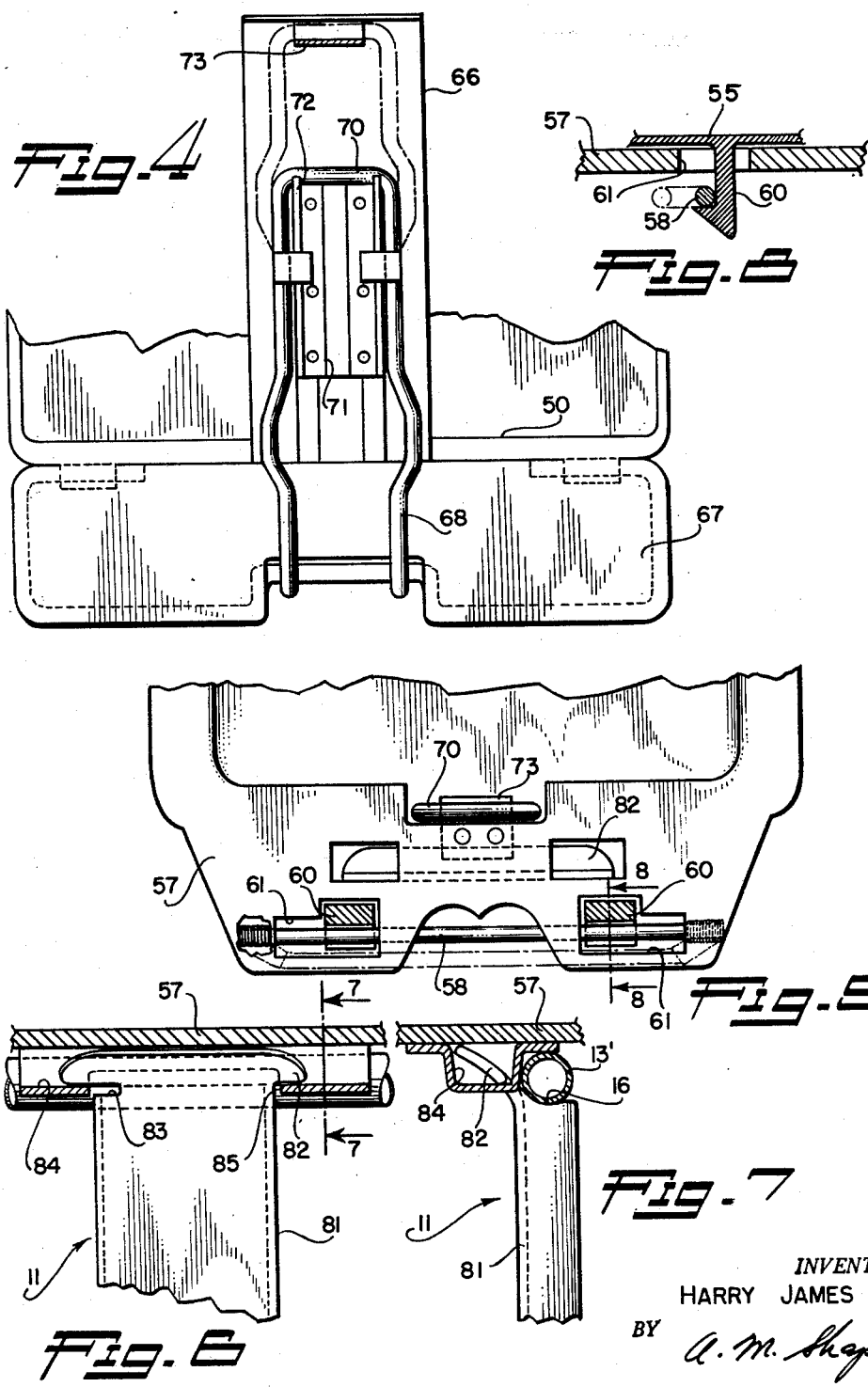

Nov. 5, 1963  H. J. WILSON  3,109,666
CONVERTIBLE AND FOLDABLE BABY APPARATUS
Filed Nov. 30, 1960  5 Sheets-Sheet 5

INVENTOR.
HARRY JAMES WILSON
BY
*A. M. Shapiro*
Attorney

United States Patent Office 3,109,666
Patented Nov. 5, 1963

3,109,666
CONVERTIBLE AND FOLDABLE BABY APPARATUS
Harry James Wilson, 10042 Chapin Way, Sunland, Calif.
Filed Nov. 30, 1960, Ser. No. 72,682
8 Claims. (Cl. 280—30)

This invention relates to improvements in convertible and foldable baby vehicles and accessory equipment. More particularly, the invention provides an improved baby support apparatus which, in one operative condition for example has the characteristics of an upright highchair and which readily and quickly may be converted into a stroller as another example and which may be collapsed or folded, at will, in a convenient carrying or storage assembly form.

In the baby equipment industry, it has been the customary practice to design, manufacture and sell separate and independently constructed baby accessories for the purposes of a baby car seat, stroller, highchair, baby walker, etc. Each accessory is sold as an independent unit and consequently, it is normally necessary to have a multiplicity and plurality of separate such accessories in order to accommodate the various services required in the rearing of an infant and baby. Each such accessory is expensive so that accumulation of several accessories is quite costly and the number of accessories requires substantial storage space when not in use.

However, in accordance with the present invention, all of the above applications and many others, are achieved through the employment of the invention which is readily and quickly convertible into one of a variety of baby accessory uses which are normally attributable to the use of separate and independent accessories.

It is among the objects of the present invention to provide a baby vehicle chassis and frame structure wherein portions are selectively adjustable between a baby stroller position and highchair position, and wherein the seat portion of the apparatus employed in either position may be readily removed from the frame for usage as a car seat and wherein the chassis, frame and operating mechanisms are foldable to provide a compact arrangement for storage and carrying purposes.

Another object of the present invention is to provide a baby vehicle chassis and frame structure which is selectively adjustable to provide a variety of functions and purposes associated with the normal requirements and usage of an infant or small child wherein the use of the apparatus may be employed for particular requirements from the time of infancy through babyhood.

Still a further object of the present invention is to provide a baby vehicle chassis and frame structure wherein portions are manually selectively adjustable to convert the apparatus readily into a variety of positions suitable for achieving many baby uses wherein such adjustable portions may be manually actuated by unskilled and nontechnical persons.

Still another object of the present invention is to provide a convertible baby chassis and frame structure which may be readily converted into several articles of baby accessory equipment without the removal of parts or the adding of additional parts to make up an independent usage.

Still another object of the present invention is to provide a convertible baby accessory apparatus which is light in weight so that when folded into a storage position may be readily carried about and when in such a storage position comprises a unitary construction having a minimum storage area requirement.

It is, moreover, a purpose and general object of the invention to improve the structure and utility of baby accessories as specifically such accessories and apparatus of the convertible and folding varieties.

Other objects and features of the invention and various advantages and characteristics of the present convertible and folding baby apparatus will be apparent from a consideration of the following detailed description when taken into connection with the accompanying drawings in which like numbers of reference denote corresponding parts throughout the several views; in which FIGURE 1 is a perspective view of a convertible and foldable baby apparatus incorporating the present invention showing the apparatus in a position for usage as a baby highchair;

FIGURE 4 is an enlarged view of a latch mechanism taken in the direction of arrows 4—4 of FIGURE 2;

FIGURE 5 is a plan view of a tray latching mechanism employed in the apparatus of FIGURE 2 taken in the direction of arrows 5—5;

FIGURE 6 is a sectional view of a portion of the latching mechanism of FIGURE 5 taken in the direction of arrows 6—6 or FIGURE 2;

FIGURE 7 is a sectional view taken in the direction of arrows 7—7 of FIGURE 6;

FIGURE 8 is a sectional view taken in the direction of arrows 8—8 of FIGURE 5;

Figure 1:
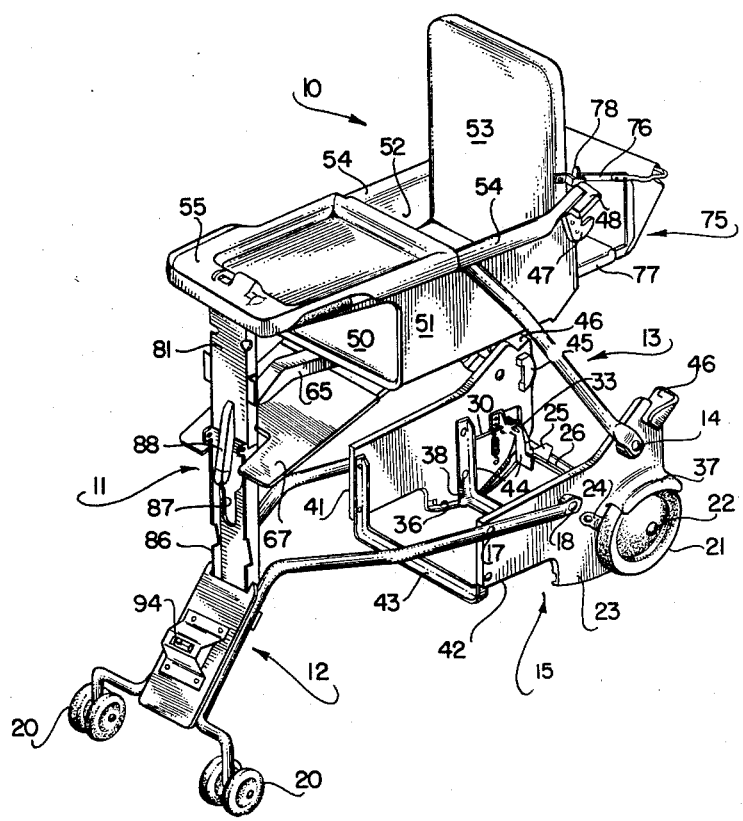
Figure 2:
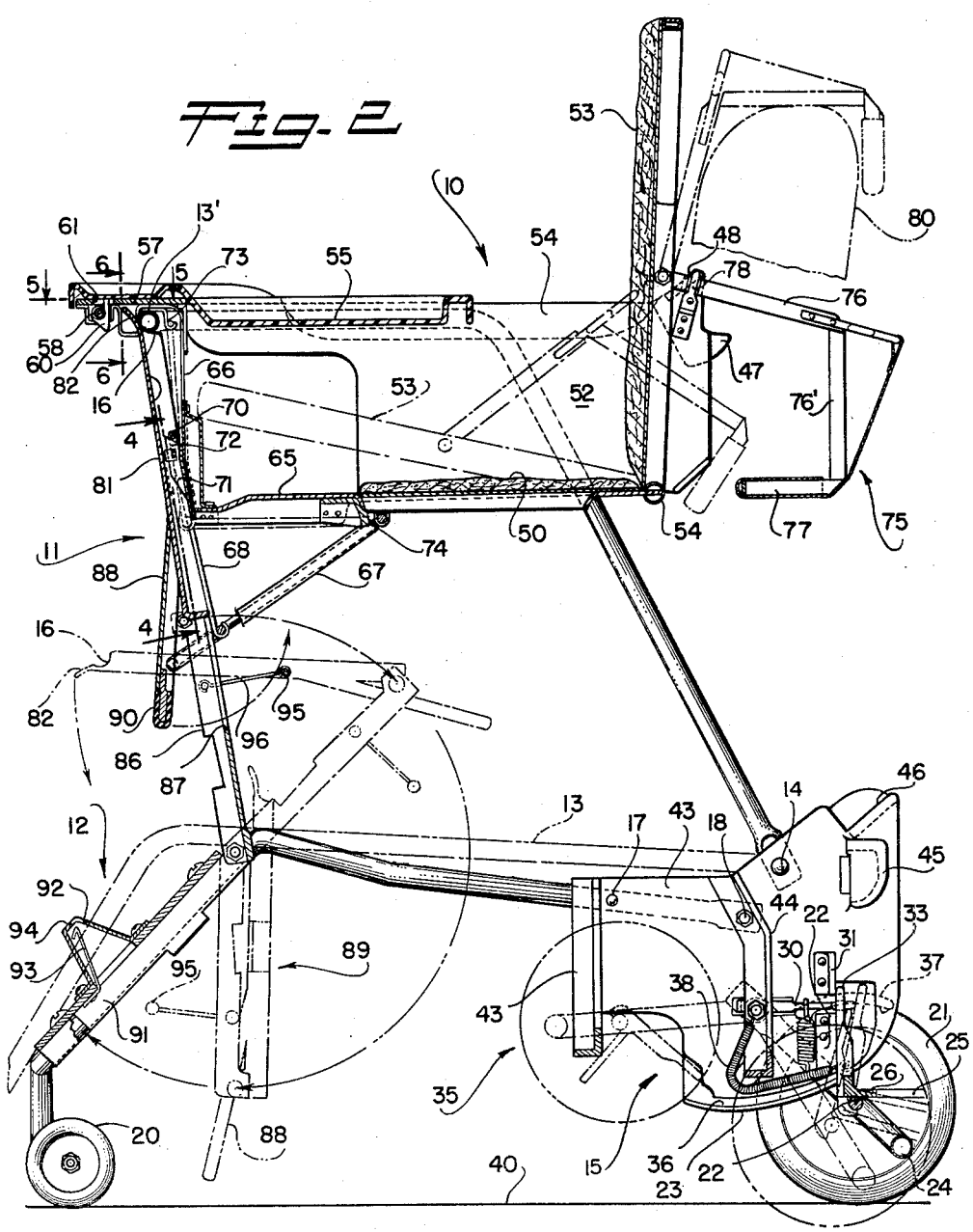
FIGURE 2 is a sectional view of the baby apparatus shown in FIGURE 1 illustrating the convertible and foldable nature of the apparatus in broken lines.

With reference to FIGURES 1 and 2, the baby apparatus of the present invention is shown in its configuration to serve as a highchair and said apparatus comprises, in general, a seat arrangement 10, a foldable front supporting stanchion 11, and a frame assembly for supporting the seat and stanchion including framework 12 and frame 13. One end of frame 13 is pivotally supported on a carriage chassis at pivot connection 14 while its opposite end is seated in an upper notch 16 of the stanchion assembly 11. Frame assembly 12 is rigidly secured to the carriage 15 by fasteners 17 and 18 so that the assembly 12 projects forwardly of the carriage 15. The opposite end of frame assembly 12 are provided with a suitable wheel arrangement 20 while the rearward portion of chassis 15 is provided with wheel arrangement 21 suitably connected to an axle 22.

Thus, it can be seen that the frame assembly 12 and carriage 15 provide a wheeled base and support for the seat assembly 10 and the front stanchion assembly 11 as well as the support frame 13. The wheel assemblies 20 are preferably of a pivoting type such that the apparatus when pushed may be suitably steered in a desired direction. The wheel assemblies 21 are secured to axle 22 which is disposed below a rounded portion 23 of the carriage 15 in spaced relationship by means of parallel axle support members 24.

Figure 9:
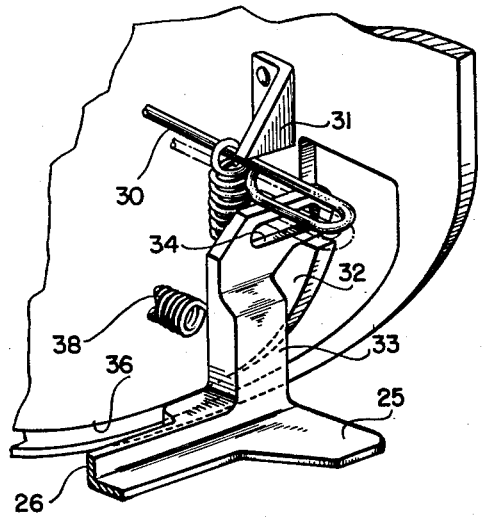
FIGURE 9 is an enlarged perspective view of the positive brake mechanism employed on the apparatus as shown in FIGURE 1.

Axle 22 is suitably acted upon by a foot lever 25 secured to a pivoting bar 26 which places the wheel assemblies 21 into one of three alternate positions of operation. One position is for compactness when the apparatus of the present invention is folded for storage purposes, another position is for holding or retaining the wheels in a fixed position to prevent rotation and the third position is in a rolling position when the apparatus is to be rendered movable. To achieve these three alternate functions, means are provided as shown in FIGURE 9 which include a spring biased member 30 projected between upper and lower stop elements 31 and 32 respectively and a member 33 attached to the foot pedal 25 having an elongated slot 34 adapted to selectively receive the free and extended end of member 30. As shown more clearly in FIGURE 2, when the wheels 21 are to be placed in the compact position for storage as shown in broken lines shown in the general direction of arrow 35, axle 22 swings about the rounded portion 23 of the carriage while the opposite end projections of the foot pedal bar 26 travel in guide grooves 36 provided on the inside of carriage 23. The entire wheel assembly 21 swings about the pivotal connection of member 24 on carriage 23. As shown in solid lines, wheel assembly 21 is in its retained or brake position having fender 37 pressed into the tire portion of wheel 21 to prevent rotation thereof. In this position, the freely extended end of member 30 is inserted through the slot of member 33. Since member 33 is connected to the pivoting foot pedal bar 26, member 33 may be easily arranged so that member 30 passes through the slot by a pivoting of the foot pedal bar. This is shown in broken lines in FIGURE 9. Furthermore, member 33 is biased in a forward direction by means of a compression spring 38 which is attached at one end to the carriage and on its opposite end to member 33. In order to obtain the forward biasing of member 33, spring 38 is directed around a portion of the carriage. When it is desired to place the wheels 21 in their normal rolling position as shown in broken lines below the ground line 40, foot pedal bar 26 is rotated to withdraw member 30 from the slot in member 33 and the rear of carriage 15 is raised slightly so that the top of member 33 seats between a lower surface of member 30 and the lower stop element 32.

Figure 3:
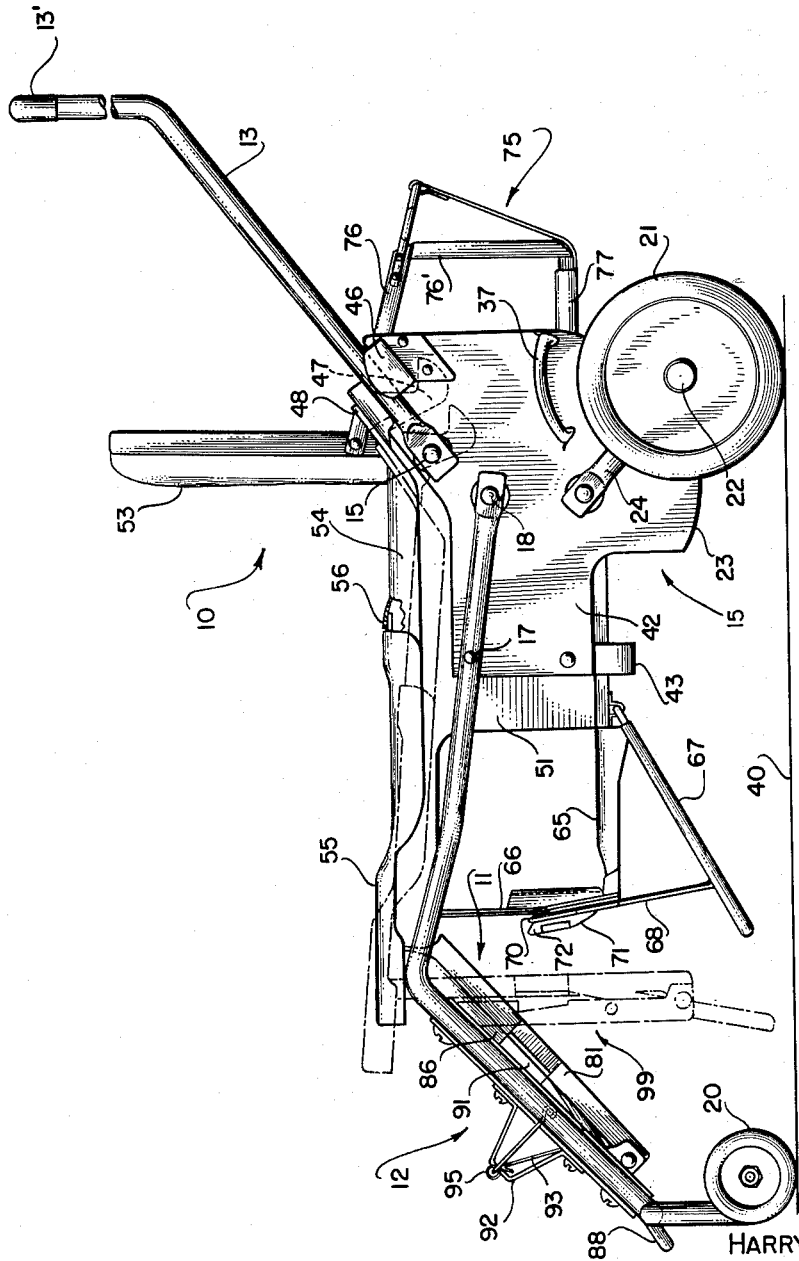
FIGURE 3 is a slide elevational view of the apparatus of FIGURE 1 converted into a baby stroller.

Carriage 15 is shown having sides 41 and 42 connected together in fixed spaced relationship by a pair of "U" shaped members 43 and 44 to provide a cavity between the sides to selectively receive the seat assembly 10. The distance between the parallel sides is greater than the width of the seat assembly so that the seat assembly may be easily accommodated therebetween. The cavity between the sides is open at the carriage forward end adjacent member 43 and open rearwardly adjacent the rear axle 22 so that the fore and aft ends of the seat assembly may extend beyond member 43 and axle 16 respectively. A receiving and seat retaining arrangement is provided for the stroller configuration on each side of the carriage 15 comprising slotted member 45 and support 46 adjacent the rearward end of the carriage 15. The receiver assembly is adapted to receive in fitted engagement with a connecting and support means on the seat assembly including hook 47 and tongue 48 which mate with members 45 and 46 respectively when the seat assembly 10 is positioned within the cavity of the carriage so that a stroller arrangement is provided as shown in FIGURE 3.

The seat assembly 10 comprises a basic seat having a supporting seat 50, parallel sides 51 and 52 and a back 53 pivotally connecting to the back of seat 50 by means of a rod 54. The seat assembly is open at its forward end in order to permit a baby's legs to extend comfortably therefrom.

The upper edges of sides 51 and 52 are folded over and downward from the inside of the seat outwardly to provide a retaining groove into which a portion of the frame 13 is received when the apparatus of the present invention is converted into a highchair as shown in FIGURES 1 and 2. The rounded portions 54 also serve as suitable arm rests for the occupant of the seat. When the apparatus is in the stroller configuration as shown in FIGURE 3, the rounded receiver portions 54 of the seat are received by the upper edges of sides 41 and 42 of the carriage while the seat portion 50 rests on the fore and aft members 43 and 44. The forward end of the seat assembly 10 is provided with a removal tray 55 which is detachably connected on one end to the rounded portions 54 by means of a suitable tongue and groove arrangement 56 as shown more clearly in FIGURE 3. The forward end of tray 55 is connected to the forward end of the seat assembly and in particular, it is detachably connected to an extended portion of the seat assembly 10 represented by the numeral 57 as shown in the enlarged view of FIGURE 5. Forward portion 57 includes a spring loaded bar 58 which receives a pair of hooked members 60 carried on the tray which when projected through holes 61 in member 57 snap around bar 58. To free tray 55 from both its forward and rearward engagement with the seat assembly, bar 58 is manually pulled forward against the retention of its biasing spring to a point where hooks 60 may be slipped passed the bar and out of holes 61 in the forward seat portion 57. At this time the forward end of the tray is free and with a slight forward movement the rearward tongue and groove arrangement 56 may be disengaged and the tray completely removed from the assembly to facilitate the entry or exit of an occupant with respect to the seat.

Seat assembly 10 is further provided with a leg separating arrangement for the seat occupant which includes a separator bar 65 connected between the forward edge of seat 50 and a narrow front piece 66. Front piece 66 is secured between the extended front portion 57 of the seat assembly and separator 65.

The seat assembly 10 is also provided with an occupant leg supporting means which includes a panel 67 pivotally secured to the underside of seat 50 near its forward edge. The panel 67 has pivotally secured on its end opposite to the pivotal mounting on seat 50, a latch means 68 having a latching end 70 as shown in enlarged detail in FIGURE 4. Front piece 66 of the seat assembly is provided on its outer side with a receiver 71 having catch means 72 on its upper end for suitably receiving the latching end 70 of the latch 68. Such a construction and arrangement is shown in solid lines with respect to FIGURE 4; however, should it be desired to arrange panel 67 to be co-extensive and co-planar with seat 50, the latching end 70 of latch 68 may be put in the position as shown in broken lines and latch onto a receiver 73 carried on the projecting end of front seat portion 57. Furthermore, should it be desired to store the panel 67 so that the occupant legs may dangle freely from the seat assembly such as when the apparatus is in its stroller configuration, panel 67 is pivoted on its mounting rearwardly and latch 67 is pivoted so that its latching end is received within the receiver 73.

A primary feature of the present invention resides in the fact that the seat assembly 10 may be completely separated from its frame and supporting structure on the wheels such that the seat assembly may be used for other purposes. For example, as shown in FIGURE 2, the seat back 53 has pivotally connected thereto a carrier represented by the general reference numeral 75 which includes a pair of parallel supporting members 76 arranged so that one member appears on each side of the seat back and a member 77 secured in fixed spaced relationship with respect to member 76 by braces 76'. The extreme end of members 76 is provided with a rod extended and connected between the two parallel members which has a piece of fabric or other suitable means carried thereon which is secured on its opposite end to the member 77. As shown in solid lines in FIGURE 2, member 76 includes a retaining means which mates with a projection 78 so that when engaged, the carrier offers a suitable grocery or article carrying compartment. Such engagement maintains the seat back in the position shown in solid lines so that the back is retained from pivoting. When such securing means is disengaged, and the members 76 and 77 are positioned as shown in broken lines, the seat assembly may be employed as a child's automobile seat whereby members 76 and 77 engage on opposite sides of the back of a car seat such as a seat back 80 shown in broken lines. Such an arrangement suitably supports the rear of the seat for car seat applications and panel 77 may be lowered to engage the forward edge of the car seat to support the front of the seating assembly.

Referring to FIGURES 5, 6 and 7, latching means are shown for detachably connecting the forward portion 57 of the seat assembly to the uppermost free end of the supporting stanchion 11. The forward supporting stanchion 11 includes a top segment 81 having a pair of extending ears 82 which project outwardly on opposite sides of segment 81. The ears are also arranged to project forwardly of the front face of segment 81 and one side of segment 81 is provided with a groove 83 immediately below one ear. The ears of segment 81 are designed to detachably engage with the underside of the forward extending portion 57 of the seat assembly by means of a hollow receiving means 84 having a slot 85 adaptable to receive the upper end of segment 81 including the ears 82. The width of the ears and the upper end of segment 81 are greater than the length of the slot 85 so that for either removal or attachment purposes, a portion of the receiver 84 is slipped into slot 83 which will permit ear 82 on the opposite side of segment 81 to be inserted through slot 85 into receiving engagement with receiver 84. Once this has been achieved, segment 83 is slightly moved to the right to disengage receiver 84 with slot 83 and the opposite ear 82 is insertable into receiver 84. The reverse of this procedure will effect the disengagement of the upper top segment 81 with the forward portion 57 of the seat assembly.

Figure 10:
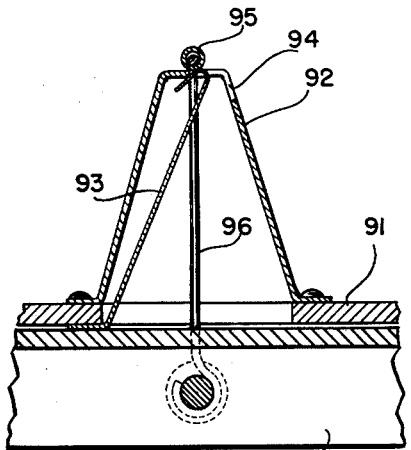
FIGURE 10 is an enlarged sectional view of a coupling employed in the embodiment of FIGURE 1 to stow the forward stanchion in its collapsed position.

In addition to the top segment 81, the front supporting stanchion 11 includes an intermediate segment 86 which is pivotally connected to one end of segment 81. Intermediate segment 82 is provided with an opening 87 through which a projection 88 carried on segment 81 passes when the stanchion is folded for conversion purposes between the highchair and the stroller configurations. FIGURE 2 shows such a folding relationship in broken lines shown in the direction of arrow 89. Projection 88 is provided with a resilient rubber tip 90 over which the handle portion 13' of frame 13 is pressed for retention purposes when the apparatus is folded for storage purposes. Frame 13 is shown in its storage position in FIGURE 2 indicated by broken lines wherein the handle portion 13' is projected forward of the wheel assemblies 20. The front supporting stanchion is provided with a lower segment 91 which is securely fastened to a framework 12 so that when segment 81 and 86 are fully extended as shown in FIGURE 2, all three segments of the stanchion are arranged in an end-to-end relationship. Segment 91 is provided with a latch mechanism 92 which includes a leaf spring hook 93 and an elongated aperture 94 provided in its forwardly projected end. This construction is more clearly shown in the enlarged view of FIGURE 10. The spring catch 93 is adapted to receive a roller 95 carried on the free end of a wire supporting means 96 which is carried on the intermediate segment 86. When the stanchion is folded as shown in the direction of arrow 89, roller 95 is projected within the latch mechanism 92 and caused to ride up the leaf spring 93 and over its hooked portion into the elongated aperture 94. At this time, the leaf spring 93 will spring behind the roller so that the upper and intermediate segments remain in a folded condition adjacent the lower segment 91 as shown in solid lines in the apparatus of FIGURE 3. It is the retention of roller 95 in the latch mechanism 92 that secures the forward end of the seat assembly in position for the stroller and storage configurations.

Figure 11:
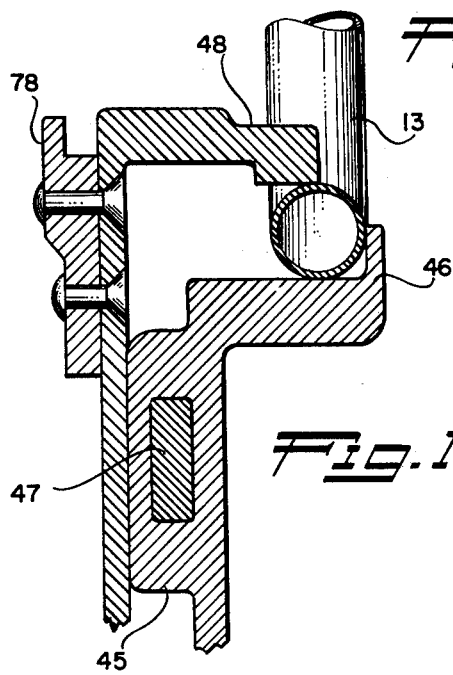
FIGURE 11 is a sectional view of the handle receiver illustrating the handle seated therein as shown in FIGURE 3.

With reference to FIGURE 3, the seating assembly is seated within the cavity of the carriage 15 and its aft end is secured to the rear portion of the carriage by means of hooks 47 engaged within the receivers 45. Furthermore, it is to be noted, as in FIGURE 11, that the frame 13 is pivoted on the carriage 15 so that it rests on members 46 held into position by means of members 48. In this position, the handle portion 13' of the frame 13 serves as a handle for controlling the stroller for pushing or directional purposes.

In actual operation, the apparatus of the present invention may be employed as a highchair as shown in FIGURE 1 and FIGURE 2. An occupant of the seat may facilitate exit or entrance into the seat by removal of tray 55 by activating rod 58 out of engagement with hooks 60 so that 60 may pass through aperture 61 provided in the forward portion 57 of the seat assembly 10 followed by lifting the tray so that the tongue and groove connection 56 may effect complete separation of the tray from the seat assembly. Panel 67 may be adjusted to one of several positions depending upon the support desired for the occupant's legs. In one position, the latch 68 may effect the position of panel 67 so that the occupant's legs are fully supported by engaging the latch end 70 with either latch 73 or hooks 72 located on the front piece 66 of the basic seat assembly. The occupant's legs will be maintained in separation because of the separator 65. To remove panel 67 from the leg area altogether, it is only required to pivot the panel rearward and to pivot the latch assembly so that its latching end 70 engages in a press-fit with the receiver 74.

The wheel assemblies 21 may be maintained movable by pivoting foot pedal 25 to place member 33 between the free end of member 30 and the lower stop 32 or foot pedal 25 may be depressed to rotate such that member 33 will clear the free end of member 30 followed so that the free end of member 30 is passed through the slot provided in member 33. This has the effect of raising the wheel assembly by pivoting on members 24 respective to the carriage 15 so that the tire portion of the wheel assembly engages with the fender 37 whereby such engagement prohibits wheel rotation.

To fold or rearrange the apparatus of the present invention from the highchair configuration as shown in FIGURES 1 and 2 into the stroller configuration as shown in FIGURE 3, the rear end of the seat assembly is raised so that the folded portions 54 along the upper edge of the sides of the seat assembly are disengaged with the frame 13. As further lifting of the seat forwardly progresses, the forward portion of the seat pivots about the upper end of the forward supporting stanchion 11 about the ears 82 until the handle portion 13' of frame 13 is fully exposed in its resting notch 16. At this time, the handle portion including frame 13 is pivoted rearwardly so that it rests on members 46. The rearward portion of the seat is secured to the carriage by inserting hook members 47 into the receivers 45. This action simultaneously places tongue members 48 over the frame 13 so that the frame is retained against members 46 in fixed position. Therefore, it is seen that through the one motion of connecting members 47 in receivers 45, both the frame and handle 13 is retained as well as the rear portion of the seat assembly.

Now the forward supporting stanchion 11 may be folded so that the segments comprising the stanchion folds into the configuration represented in the direction of arrow 89 of FIGURE 2. Folded segments 81 and 86 are further pivoted so that roller 85 rides up leaf spring 93 and through aperture 94 of the latch 92 so that the forward end of the seat assembly is firmly retained.

Once the forward and rearward ends of the seat assembly have been retained, the legs supporting panel 67 may be suitably arranged for the comfort of the occupant. Furthermore, a feature of the present invention resides in the fact that the stroller configuration may easily be transformed into a baby walker by positioning panel 67 rearwardly out of the way of the occupant's legs so that the occupant's feet will come in contact with the floor. In such a configuration, the apparatus of the present invention serves as a baby walker so that the baby may use his legs to move the stroller about while the baby's weight is supported by the seat assembly.

In order to provide a compact arrangement for the apparatus of the present invention so that it may be readily stored in closets, carried about or easily stored in an automobile, roller 95 is released from the latch mechanism 92 so that segments 81 and 86 take the position as shown in broken lines in FIGURE 3 in the direction of arrow 99. At this time hooks 47 are disconnected from the receivers 45 and the rearward portion of the seat assembly is disconnected from the carriage and permitted to settle and seat against the foot pedal bar 26. The handle and frame 13 is then pivoted forwardly into the position shown in dotted lines in FIGURE 2. This action is followed by pushing the folded segments 81 and 86 forward so that roller 95 once again engages with latch 92 which holds the seat assembly into engagement with its supporting members. As the folded segments 81 and 86 move forward, snubber and projection 88 are pressed over the handle portion 13' of the frame 13 so that the frame 13 is firmly held in place. Frame 13, in this manner, maintains the rear portion of the seat assembly within the carriage 15. Seat back 53 may be pivoted forwardly when members 76 are disengaged from projections 78 so that the back folds against the seat 50 as shown in broken lines in FIGURE 2. Next, the wheel assemblies 21 may be folded into the position shown in broken lines in the direction of arrow 35 of FIGURE 2 by actuating the foot pedal 25 so that member 33 clears the lower stop 32 and mates with the guide groove 36. The guide groove prevents pedal 25 from rotation so that the wheels may be pivoted on members 24 into the stored position.

Therefore, it is seen that the apparatus of the present invention may be readily convertible into a highchair, a stroller, a baby walker, a car set, etc. Such a conversion of the apparatus from one configuration to another is achieved without adding or taking away of parts, special tools or the need for special skill. The conversion from one configuration to another is achieved by means of a plurality of easily detachable connectable latches which through simple manual press fitting pressure can be connected or disconnected easily. No special detachable fasteners, connectors, thumb screws or other means are required to achieve a sturdy and easily convertible apparatus. Furthermore, the apparatus of the present invention lends itself for other modifications such as the inclusion of a detachable sunshade or overhead cover which may be readily fastened to the back of seat back 53 or for the accommodation of a child's potty which may be readily accommodated in a hole provided in the seat 50 of the seat assembly 10.

Having described only typical forms of the invention, I do not wish to be limited to the specific details herein set forth, but wish to reserve to myself any variations or modifications that may appear to those skilled in the art and fall within the scope of the following claims.

I claim:

1. A baby apparatus comprising, a mobile support structure including a carriage and an elongated projecting frame attached at one end to the carriage, a foldable forward supporting stanchion pivotally secured at one end to the projecting frame, a handle frame pivotally secured to the carriage having a forward position and a rearward position, and a seat assembly having its front end supported on the stanchion and its sides supported on the handle frame when the handle frame is in its first position and its rear end detachably secured to the carriage when the handle frame is in its rearward position.

2. A baby apparatus comprising, a mobile support structure including a carriage and an elongated projecting frame attached at one end to the carriage, a foldable forward supporting stanchion pivotally secured at one end to the free end of the projecting frame, a handle frame pivotally secured to the carriage having a forward position in which the handle frame is supported on the stanchion and a rearward position in which the handle frame is supported on the carriage, and a seat assembly having its front end supported on the stanchion and its sides detachably supported on the handle frame when the handle frame is in its first position and its rear end detachably secured to the carriage when the handle frame is in its rearward position.

3. A baby apparatus comprising, a mobile support structure including a carriage and an elongated forward projecting frame attached at one end to the carriage, wheel assemblies movably attached to the free end of the frame and to the carriage, a foldable forward supporting stanchion pivotally secured to the free end of the projecting frame, a handle frame pivotally secured to the carriage having a forward position when the apparatus is employed as a highchair and a rearward position when the apparatus is employed as a stroller, and a seat assembly having its front end support on the stanchion and its sides detachably supported on the handle frame when the handle frame is in its first position and its rear end detachably secured to the carriage when the handle frame is in its rearward position.

4. A baby apparatus comprising, a mobile support structure including a carriage having handle frame receivers and seat receivers and an elongated projecting frame attached at one end to the carriage, a foldable forward supporting stanchion pivotally secured at one end to the free end of the projecting frame, a handle frame pivotally secured to the carriage having a forward position in which a portion of the frame is supported on the free end of the stanchion and a rearward position in which the frame is supported on the carriage frame receivers, and a seat assembly having its front end supported on the stanchion when unfolded and its sides supported on the handle frame when the handle frame is in its first position and its rear end detachably secured to the carriage seat receivers when the handle frame is in its rearward position and when the stanchion is folded.

5. The invention as defined in claim 4 wherein the handle frame is adapted to be pivoted on the carriage to a third position for retaining the seat assembly in a storage arrangement and means on the supporting stanchion for securing the handle frame in its third position.

6. The invention as defined in claim 4 including wheel assemblies on said carriage of the support structure selectively operable to a brake position, a storage position and a free rolling position.

7. A convertible baby apparatus comprising, a mobile support structure including a carriage support and a handle frame pivoted thereon to a first and second position, a seat assembly, means connecting the front of the seat assembly to the carriage support, means detachably connecting the rear of the seat assembly to the carriage support when the handle frame is in its second position to provide a stroller, the seat assembly supported on the handle frame when the frame is in its first position to provide a highchair, a panel pivotally secured to the seat assembly, latch means pivotally carried on the panel, and latch receiver means carried on the means connecting the front of the seat assembly to the carriage adapted to receive the latch means for placing the panel in a predetermined position for supporting the legs of an occupant in the seat assembly in the first and second position.

8. A convertible baby apparatus comprising, a mobile support structure including a carriage support and a handle frame pivoted thereon to a first and second position, a seat assembly, means connecting the front of the seat assembly to the carriage support, means detachably connecting the rear of the seat assembly to the carriage support when the handle frame is in its second position to provide a stroller, the seat assembly supported on the handle frame when the frame is in its first position to provide a highchair, means for disconnectably securing the seat assembly to the means connecting the front of the seat assembly to the carriage support so that the seat assembly may be completely separated from the support structure, and a car seat supporting means pivotally attached to the seat assembly for supporting the seat assembly on the seat back of a car seat.

References Cited in the file of this patent

UNITED STATES PATENTS

| | | | |
|---|---|---|---|
| 2,449,618 | Pritchard | | Sept. 21, 1948 |
| 2,634,791 | Weirich | | Apr. 14, 1953 |
| 2,754,889 | Lovelace | | July 17, 1956 |
| 2,886,337 | Quisenberry | | May 12, 1959 |

FOREIGN PATENTS

| | | | |
|---|---|---|---|
| 349,008 | Italy | | June 5, 1937 |
| 449,344 | Italy | | June 11, 1949 |